Oct. 29, 1963  F. J. WINCHELL  3,108,495
TRANSMISSION
Filed April 29, 1960
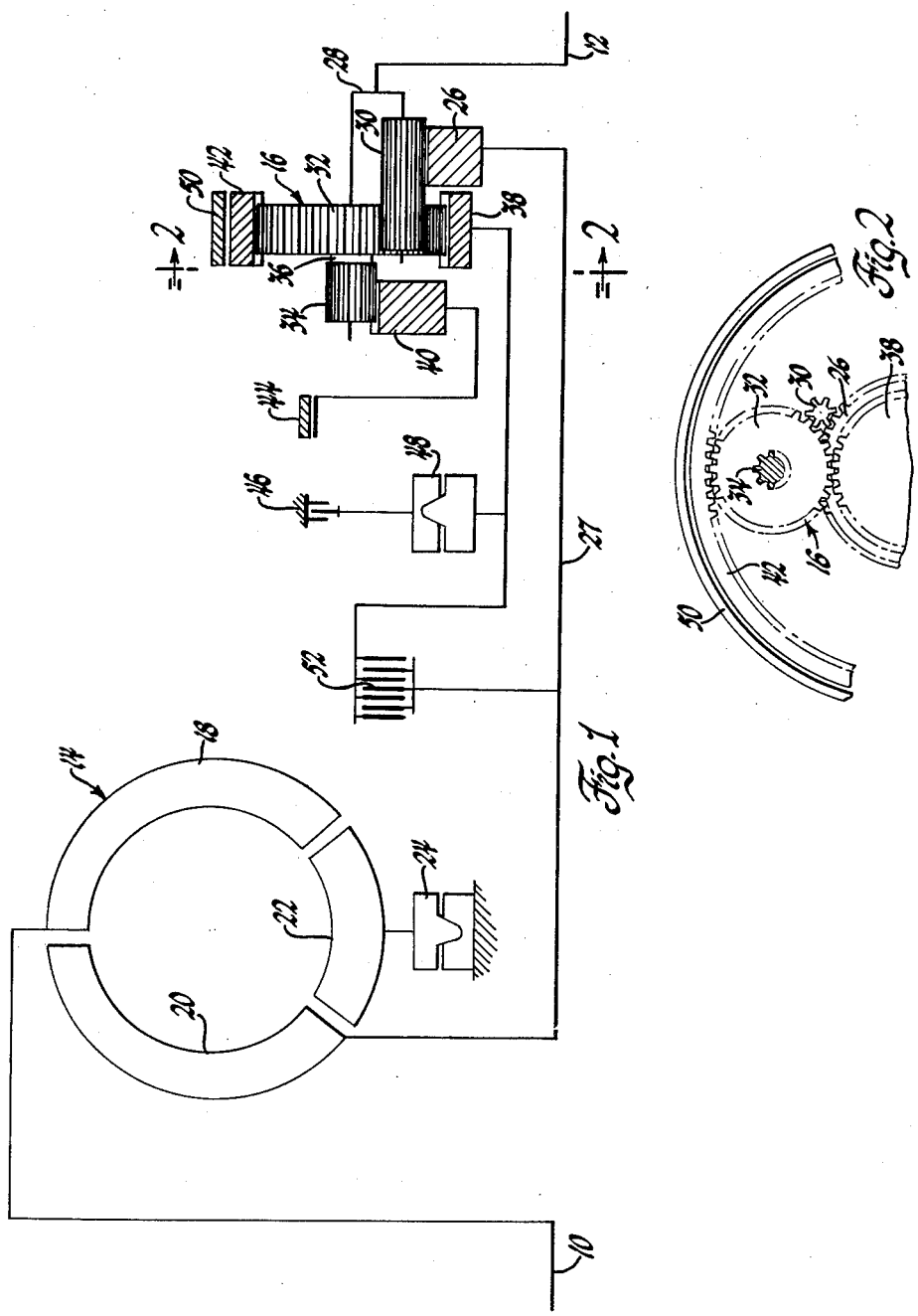
INVENTOR.
Frank J. Winchell
BY
Hugh L. Fisher
ATTORNEY United States Patent Office 3,108,495
Patented Oct. 29, 1963

3,108,495
TRANSMISSION
Frank J. Winchell, Bloomfield Hills, Mich., assignor to General Motors Corporation, Detroit, Mich., a corporation of Delaware
Filed Apr. 29, 1960, Ser. No. 25,769
2 Claims. (Cl. 74—761)

This invention relates to improvements in power transmissions.

Power transmitting equipment should, in general, afford maximum ratio coverage efficiently while consuming a minimum of space. These objectives are particularly difficult to attain in a vehicle transmission because of the need to conform to accepted mass production techniques and the dictates of styling trends. To explain further, in reducing the axial and radial space requirements of a transmission, not only do the individual components become difficult to fabricate but the assembly of the components within a too confining enclosure together render costs prohibitive. Additionally, subsequent servicing is time-consuming and therefore costly. As for the ratio coverage, individual ratios are often too few or the spacing is undesirable, i.e., the steps between ratios are too great or too small.

Accordingly, the invention contemplates a novel transmission in which the components are uniquely arranged so as to consume a minimum of axial space and so as to afford maximum drive ratio coverage within a range that permits application of the transmission to many diverse uses.

Also, the invention seeks to furnish novelly compounded planetary gearing so constructed and arranged as to offer a maximum number of drive ratios with a minimum number of components, each of which is easily produced and assembled into an efficiently operating unit. More specifically, the planetary gearing contemplated by the invention employs one basic planetary gear unit from which three Forward Drive ratios and one Reverse Drive ratio are obtained.

The foregoing and other objects and advantages of the invention will be apparent from the following description and from the accompanying drawings in which:

FIGURE 1 is a schematic diagram of a transmission incorporating the principles of the invention; and FIGURE 2 is a sectional view of the transmission taken in the direction of arrows 2—2 in FIGURE 1 so as to illustrate planet pinion alignment.

*General Arrangement*

Referring to the drawings, and particularly to FIGURE 1, the numerals 10 and 12 denote respectively a power shaft 10 and a load shaft 12. The power shaft 10 may be joined to a power source such as a vehicle engine (not shown) whereas the load shaft functions as an output and may be drive related to the vehicle wheels in the usual way. Interposed between the shafts 10 and 12 are a hydrodynamic torque transmitting device, in this embodiment, a torque converter 14 and planetary gearing denoted generally at 16. This drive arrangement, as will become apparent, affords three separate Forward Drive ratios and one Reverse Drive ratio, each of which may be supplemented by the torque multiplication obtained from the converter 14, thereby making available very substantial ratio coverage.

Considering first the structure of the torque converter 14, as can be seen it comprises three suitable vaned elements, one an impeller 18 drive connected to the power shaft 10; the second, a turbine 20; and the third, a stator or reactor 22, which is restrained from reverse rotation by an appropriate one-way device 24. This one-way device 24 by way of suggestion may be of a character employing rollers, sprags, or the equivalent, and constructed so as to prevent relative rotation between confining races in one direction only. In a way known by those versed in the art, forward rotation of the converter impeller 18 will commence the circulation of fluid within a working circuit commencing at the impeller 18 and proceeding consecutively through the vane structures of turbine 20 and stator 22, and then back to the impeller 18.

Upon commencement of rotation of the impeller 18, and assuming that the turbine 20 is stalled or held stationary by a load, the converter 14 will at this time afford maximum torque multiplication and thereafter, as the speed of rotation of the turbine increases, this torque multiplication will diminish until at the so-called coupling point, the stator 22 will commence to rotate forwardly, this being permitted by the one-way device 24. The torque converter 14 will thereafter function as a fluid coupling and no longer afford torque multiplication.

The planetary gearing 16, as can be seen, is basically a single gear unit fitted into the drive train so as to have an input sun gear 26 drive secured through the agency of shafting 27 to the converter turbine 20 and an output planet carrier 28 affixed to load shaft 12. Journaled on the output planet carrier 28 are one or more of three different planet pinions assigned the numerals 30, 32, and 34, and hereinafter referred to respectively as input, intermediate speed, and low speed planet pinions. The relationship of these pinions to each other is illustrated in FIGURE 2 and as can be seen, the intermediate speed planet pinion 32 intermeshes with the input planet pinion 30 and also is formed either separately or integrally with the low speed planet pinion 34 so that they will revolve together. Preferably, they are integral and are separated by an undercut or relieved portion 36, if needed, that facilitates the cutting of the gear teeth on the low speed planet pinion 34. Completing the gearing 16 is an intermediate speed reaction sun gear 38 engaging intermediate speed planet pinion 32, a low speed reaction sun gear 40 mating with low speed planet pinion 34, and a reverse reaction ring gear 42 also in mesh with intermediate speed planet pinion 32. If preferred, and this would be determined by the desired Reverse Drive ratio, the reverse ring gear 42 can be proportioned, as will become apparent, so as to mesh with the low speed planet pinion 34 instead of pinion 32.

Several ratio changing devices are incorporated in the construction to obtain the desired ratio coverage. These include a low brake 44 that restrains rotation of the low speed reaction sun gear 40 in either direction, an intermediate speed brake 46 that cooperates with a one-way device 48 similar to the device 24 to prevent reverse rotation of the intermediate speed reaction sun gear 38, and a reverse brake 50 that holds reverse ring gear 42. Also included is a direct drive clutch 52 that is interposed between shafting 27 and the intermediate speed reaction sun gear 38.

The brakes 44, 46, and 50 may utilize bands, disks, cones, etc. and the clutch 52 may be of the disk, cone, or equivalent type. The clutch and the brakes may be operated in any known fashion either automatically or manually such as through utilization of hydraulic pressure for the actuation thereof, this being understood by those familiar with this art.

*Operation*

The transmission may be conditioned for several different operating phases, which will be described separately. These phases are identified as Neutral, Forward Drive including a low speed drive, an intermediate speed drive, a direct drive, and a Reverse Drive.

The Neutral no drive condition results when each of the brakes 44, 46, and 50 and clutch 52 are disengaged. The torque converter 14 may be provided with operating fluid in any known manner so as to be instantly prepared for either Forward or Reverse Drive, otherwise there would be a lag or delay in drive establishment due to the need to fill the converter 14. With all of the clutches and brakes disengaged, the gearing 16 cannot drive, there being no drive sustaining member therefor, and hence, the operation of the converter 14 will in no way affect the Neutral status of the transmission.

To commence Forward Drive in the lowest speed ratio, i.e., the load shaft 12 revolves at its slowest rate relative to the power shaft 10, only the low speed drive brake 44 is engaged. Now, with the converter turbine 20 revolving the input sun gear 26 forwardly, input planet pinion 30 will revolve reversely; intermediate speed pinion 32 and accordingly low speed pinion 34 will revolve forwardly, and the resultant tendency will be for the low speed reaction sun gear 40 to revolve backwards. Since brake 44 prevents this, the low speed pinion 34 will walk around the stationary low speed reaction sun gear 40 and cause the output planet carrier 28 to revolve in the forward direction at a reduced speed relative to the input sun gear 26 and carry therewith the load shaft 12.

To establish the next higher speed, the intermediate speed drive, only the intermediate speed brake 46 is engaged. Then, in a way similar to that occurring in the low speed drive, the reverse rotational tendency of the intermediate speed reaction sun gear 38 will be prevented by the combined efforts of the one-way device 48 and the intermediate speed brake 46. Again, the output planet carrier 28 will be caused to revolve forwardly at a somewhat faster speed than in the low speed drive, but still slower than the input sun gear 26, the intermediate speed planet pinion 32 walking around the stationary intermediate speed reaction gear 38. This completes the drive train for revolving the load shaft 12 in the intermediate speed drive ratio.

When Direct Drive is wanted, the direct drive clutch 52 is engaged. If the transmission is being upshifted from the intermediate speed drive, the intermediate speed brake 46 may be maintained engaged. As becomes apparent, with the direct drive clutch 52 engaged both the intermediate speed reaction sun gear 38 and the input sun gar 26 will be revolved forwardly together at the speed of the converter turbine 20. The one-way device 48 permits such forward rotation of the intermediate speed reaction sun gear 38, and therefore, the intermediate speed brake 46 can be maintained engaged so that only one friction device may be engaged in this speed as in the low and intermediate speed drives. Because the two sun gears 38 and 26 are coupled to revolve together by the action of the direct drive clutch 52, the gearing 16 will be locked up, i.e., a direct connection will be established between the sun gears 38 and 26 and the output planet carrier 28, each revolving at the same speed and the various gears of the gearing 16 will all revolve at the same speed. With such a 1:1 drive, the load shaft 12 will be revolved, if the converter 14 is functioning as a coupling, at substantially the same speed as the power shaft 10. A slight difference in speeds will result due to the inherent slippage through the converter 14.

For Reverse Drive, only the reverse drive brake 50 is engaged so as to hold the reverse ring gear 42 stationary. Again, in following the rotations of the different gears performing an active part in establishment of Reverse, the input sun gear 26 will revolve forwardly; the input planet pinions 30 backwards; and the intermediate speed planet pinion 32 forwardly. The forward rotational tendency transferred to the reverse ring gear 42 by the intermediate speed planet pinion 32 is resisted by the restraint offered by the reverse drive brake 50, and consequently, the intermediate speed planet pinion 32 and low speed planet pinion 34 will travel around the stationary reverse ring gear 42 in a way to cause the output planet carrier 28 and necessarily the load shaft 12 to revolve rearwardly at a reduced speed relative to the input sun gear 26.

Suggested tooth numbers, which are for exemplary purposes only, are as indicated in the following chart:

| Gear: | No. of teeth |
|---|---|
| Ring gear 42 | 73 |
| Input sun gear 26 | 31 |
| Intermediate speed sun gear 38 | 23 |
| Low speed sun gear 40 | 35 |
| Input planet pinion 30 | 18 |
| Intermediate speed planet pinion 32 | 31 |
| Low speed planet pinion 34 | 19 |

The different gear ratios attainable with these tooth numbers are a 2.84 low speed drive ratio; a 1.74 intermediate speed ratio; and a 2.84 Reverse Drive ratio, each ratio indicating the number of revolutions made by the shafting 27 when the load shaft 12 is being revolved once. The over-all ratio will, of course, be the product of that obtained from the torque converter 14 and the suggested gearing ratio in the particular speed at which the transmission is operating. The 2.84 Reverse Drive ratio presumes that the ring gear 42 is meshing with the low speed planet pinion 34. If it is preferred that the ring gear 42 mesh with the intermediate speed planet pinion 32, the ring gear 42 would require approximately 85 teeth, assuming the other tooth numbers are maintained, and the Reverse Drive ratio would become 1.74.

From the foregoing description, and from an inspection of the drawings, it can be appreciated that the transmission is particularly suited for axial compactness, much of which is attributed to the planetary gearing arrangement. Significant also is the fact that the gearing 16 comprises a minimum number of elements that afford three Forward Drive ratios and one Reverse, each of which is established by the engagement of only one friction engaging device negating the need for any complex control system for coordinating the ratio changes. Important too is the ratio coverage, which permits the transmission to be utilized in many different applications.

The invention is to be limited only by the following claims.

I claim:

1. A planetary gear unit comprising an input sun gear, an output planet carrier having input, intermediate speed, and low speed planet pinions journaled thereon and so arranged as to have the input and intermediate speed planet pinions in intermeshing relation and the low speed and intermediate speed planet pinions revolvable together, low and intermediate speed reaction sun gears meshing respectively with the low and intermediate planet pinions, the input sun gear meshing with the input planet pinion, a reverse ring gear meshing with one of the low speed and intermediate speed planet pinions, a low speed brake for preventing rotation of the low speed reaction sun gear so as to cause the gear unit to provide a low speed ratio, an intermediate speed brake including a one-way device for preventing rotation of the intermediate reaction sun gear in one direction so as to cause the gear unit to afford an intermediate speed ratio, a direct drive clutch for joining together the input sun gear and the intermediate speed reaction sun gear so as to lock up the planetary gear unit for a direct ratio, and a reverse drive brake for preventing rotation of the reverse ring gear thereby causing the output planet carrier to be revolved rearwardly relative to the input sun gear.

2. A planetary gear unit comprising an input gear, an output planet carrier having first, second, and third planet pinions journaled thereon and so arranged as to have the third and first planet pinions in intermeshing relation and the second and third planet pinions joined together for conjoint rotation, first and second forward drive reaction gears meshing respectively with the second and third planet pinions, the input gear meshing with the first planet pinion, a reverse gear meshing with one of the second and third planet pinions, first and second brakes for respectively holding against rotation the first and second reaction gears thereby causing the gear unit to provide two different forward drive ratios, clutch means for joining the input gear and one of the reaction gears so as to provide a third forward drive ratio, and a reverse drive brake for preventing rotation of the reverse gear thereby causing the output planet carrier to be revolved rearwardly relative to the input gear.

References Cited in the file of this patent

UNITED STATES PATENTS

| | | |
|---|---|---|
| 2,239,973 | Ravigneaux | Apr. 29, 1941 |
| 2,777,337 | Hultin | Jan. 15, 1957 |
| 2,929,271 | Miller | Mar. 22, 1960 |
| 3,023,637 | De Lorean | Mar. 6, 1962 |

FOREIGN PATENTS

| | | |
|---|---|---|
| 1,034,681 | France | Apr. 15, 1953 |